Figure 1:
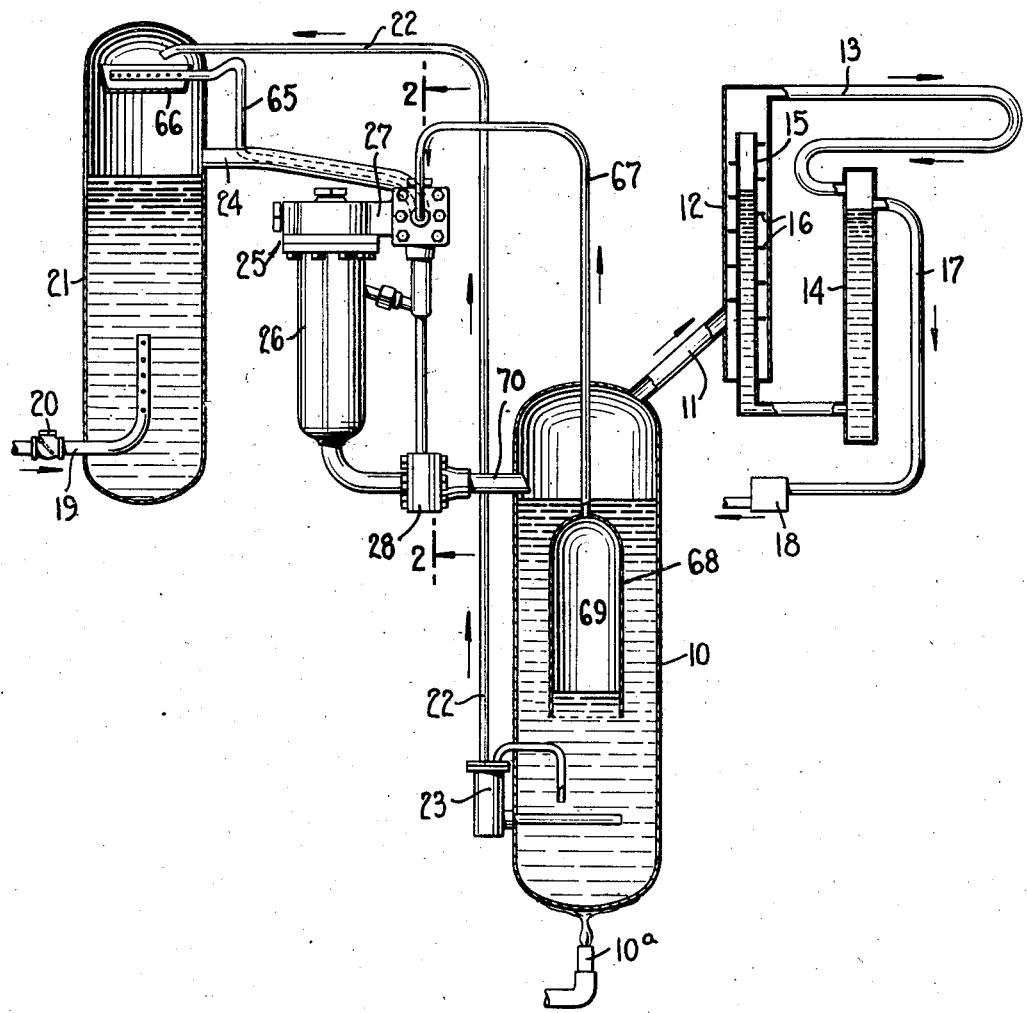

May 21, 1935.  E. H. RYDEN  2,001,797
REFRIGERATION
Filed Feb. 2, 1932   3 Sheets-Sheet 1

INVENTOR.
Eric H. Ryden
BY
ATTORNEY

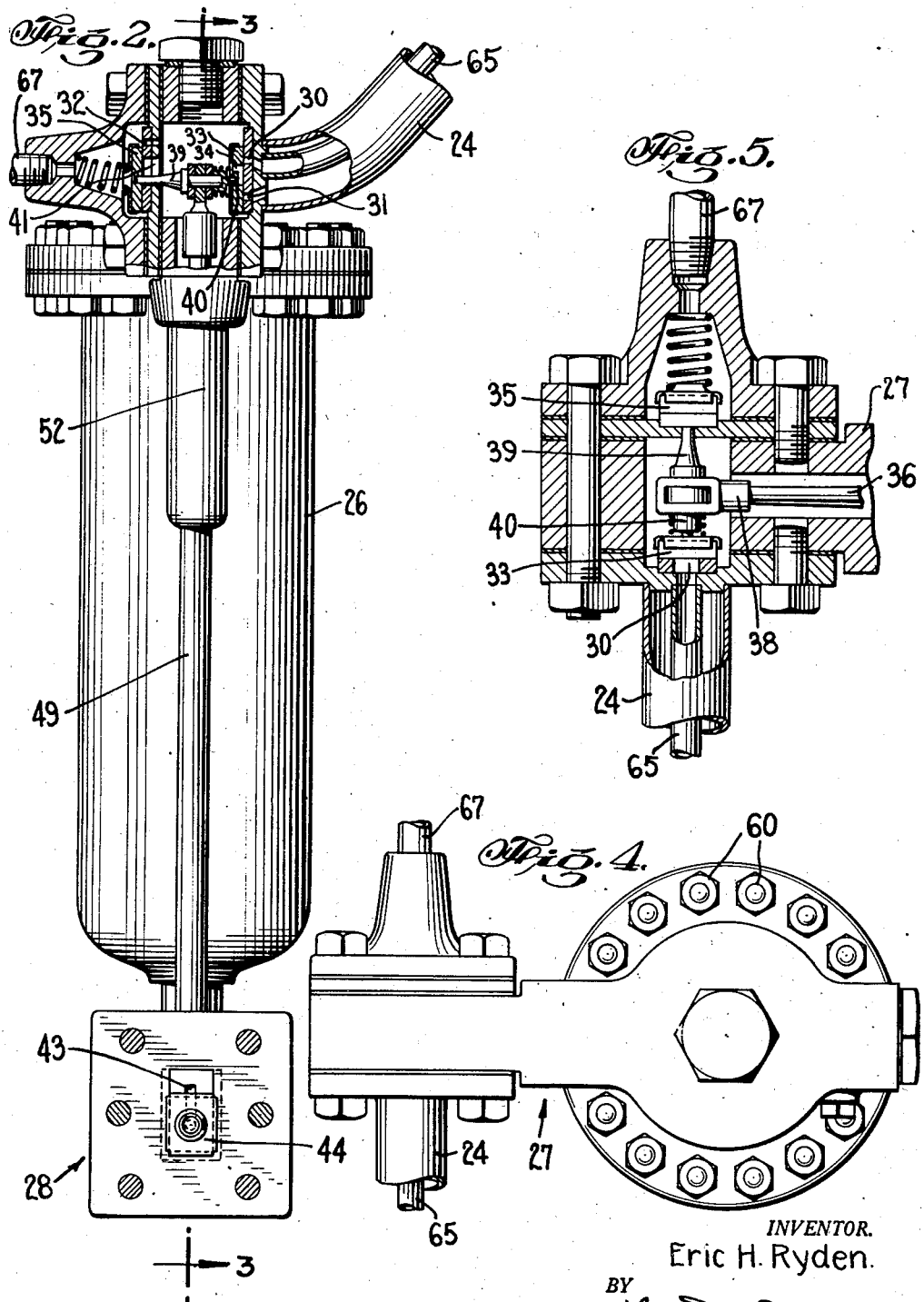

May 21, 1935.  E. H. RYDEN  2,001,797
REFRIGERATION
Filed Feb. 2, 1932  3 Sheets-Sheet 3
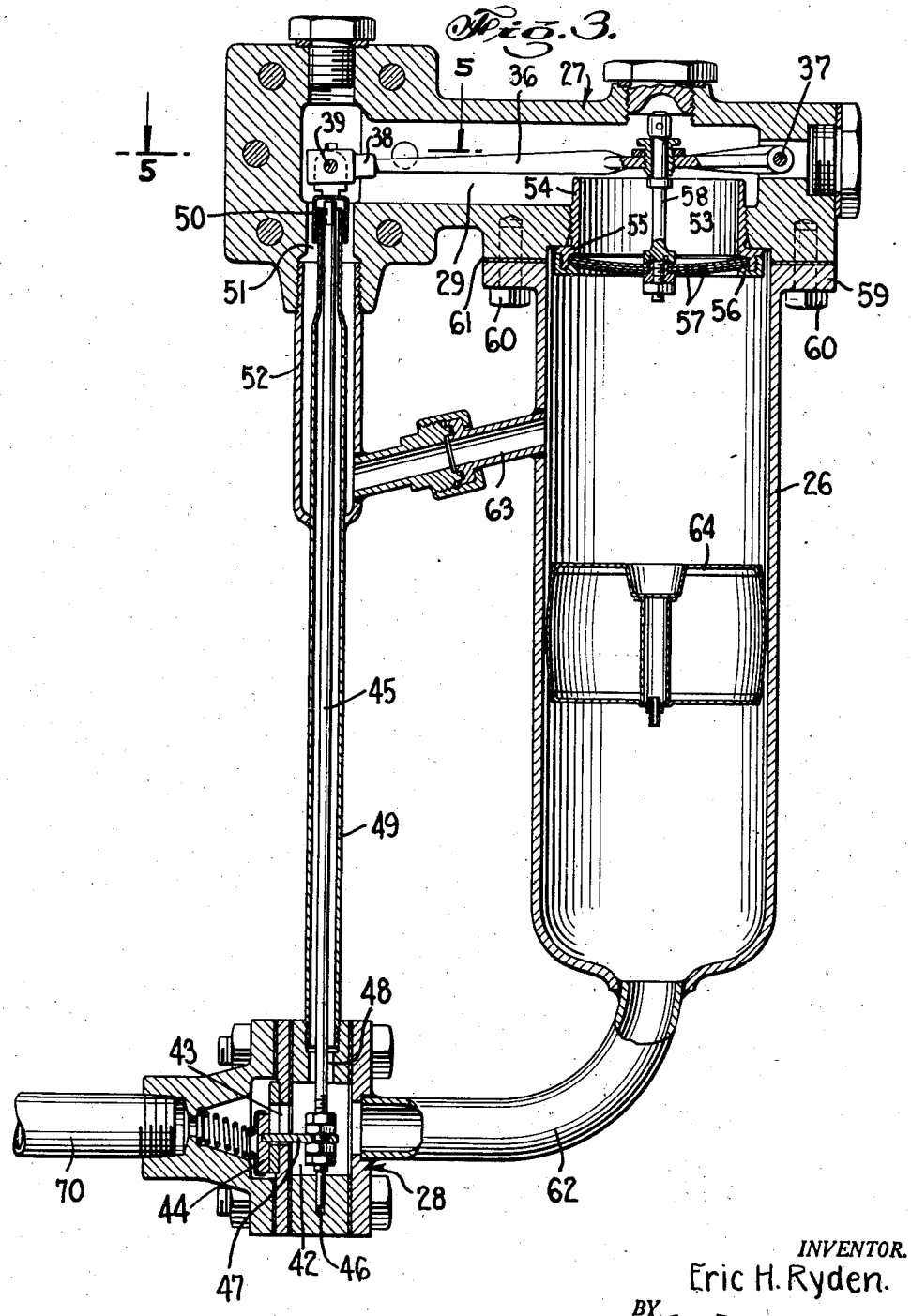
INVENTOR.
Eric H. Ryden.
BY
ATTORNEY Patented May 21, 1935

2,001,797

UNITED STATES PATENT OFFICE 2,001,797

REFRIGERATION

Eric H. Ryden, New York, N. Y., assignor to Electrolux Servel Corporation, New York, N. Y., a corporation of Delaware Application February 2, 1932, Serial No. 590,379

15 Claims. (Cl. 62—5)

This invention relates to absorption refrigerating systems of a two-pressure continuous type and more particularly to the circulation of absorption liquid in such systems.

Briefly, this invention contemplates in systems of this type an intermediate container between the absorber and the generator. Enriched absorption liquid from the absorber flows into the intermediate container by gravity and then the pressure is increased in this container to such a value that the liquid flows into the generator by gravity. Such arrangements are variously old and well known in the art and it is an object of the invention to provide in such an arrangement a new and improved method of and apparatus for controlling the transfer operation.

A further object is to make available in the transfer vessel a pressure above that in the generator whereby the flow of liquid into the generator during the transfer period is accelerated.

Further objects and advantages will be apparent from the following description taken in connection with the accompanying drawings, in which, Fig. 1 shows a refrigerating system contemplated by this invention;

Fig. 2, a view of the transfer device taken on line 2—2 of Fig. 1;

Fig. 3, a vertical section of the transfer device taken on line 3—3 of Fig. 2;

Fig. 4, a plan view of the transfer device; and

Fig. 5, a horizontal section taken on line 5—5 of Fig. 3.

Referring to Fig. 1 of the drawings, a generator 10 contains a solution of refrigerant, such as ammonia, in an absorption liquid, such as water, and is heated by any suitable means such as a gas burner 10a. Refrigerant gas expelled from solution in the generator passes through conduit 11 to the rectifier 12 in which any entrained absorption liquid vapor is condensed out and flows back to the generator by gravity through conduit 11. From the rectifier refrigerant vapor passes into the condenser 13 where heat is removed and the gas condensed to a liquid which flows into a receiver 14 which may be in the form of a U-tube, as illustrated, with one leg 15 extending upwardly within and opening into the upper part of the rectifier 12 and provided with baffles 16 for good thermal exchange. From the receiver 14 liquid refrigerant overflows into a conduit 17 and passes to the evaporator (not shown) through a float valve or any other suitable control device 18.

From the evaporator refrigerant gas flows through conduit 19 provided with a back pressure check valve 20 into the absorber 21 where it bubbles upwardly through and goes into solution with absorption liquid from which refrigerant gas has been expelled in the generator and which flows from the generator through conduit 22 into the upper part of the absorber 21. The flow of weak absorption liquid from the generator to the absorber through the conduit 22 is controlled responsive to the temperature of the liquid in the generator 10 by a thermal responsive control device 23, as well known in the art. As weak absorption liquid and refrigerant gas from the evaporator enter the absorber 21 the level of enriched absorption liquid rises until it overflows through conduit 24 into the transfer device 25 from which it is intermittently returned to the generator 10 as hereinafter more fully described.

As best illustrated by Figs. 2, 3, 4, and 5, the transfer device comprises a liquid container 26, an upper valve casing 27, and a lower valve casing 28. The upper valve casing encloses a chamber 29 provided on one side with valve ports 30 and 31 and on the other side with valve port 32, as best shown in Fig. 2. A spring pressed sliding valve member 33 provided with an opening 34 is adapted to open and close valve ports 30 and 31 in its upper and lower positions respectively, the opening 34 being spaced such that valve port 30 is opened slightly in advance of valve port 31. The opening 34 is of sufficient height that port 30 is open therethrough when member 33 in its upper position uncovers port 31 and is located such that port 30 is uncovered and opened therethrough during the upward movement of member 33 before the bottom of the latter uncovers the port 31. A spring pressed sliding valve member 35 is adapted to close and open valve port 32 in its upper and lower positions respectively. The valve members 33' and 35 are arranged to be simultaneously operated by the movement of the valve operating lever 36 which is pivoted in one end of the valve chamber 29 at 37 and is connected at its other free end 38 by a pin 39 to the valve member 35 and a pin 40 to the valve member 33, the pin 39 extending through a slot 41 in the valve casing as shown.

The lower valve casing 28 encloses a valve chamber 42 having a valve opening in the form of a vertical slot 43 which is adapted to be closed and opened by a spring pressed sliding valve member 44 in its upper and lower positions respectively. The valve member 44 is operated simultaneously with the upper valve members 33 and 35 by a vertical rod 45 which is connected at its upper end to the free end 38 of the valve operating lever 36 and slidably journaled at its lower end in a recess 46 in the lower valve casing 28, the valve member 44 being moved by a pin 47 extending from the rod 45 through the valve slot 43.

To avoid a stuffing box around the valve rod 45 where it extends through the opening 48 in the lower valve casing 28 a tube 49 is provided around the valve rod 45 which in effect extends the opening 48 of the lower valve chamber 42 up to the top of tube 49 within the upper valve chamber 29. A cap 50 secured on the upper end of the valve rod 45 extends downwardly over the open end of the tube 49 to prevent liquid from flowing into this tube during the operation as hereinafter described. The opening 51 in the lower part of the upper valve casing 27 through which tube 49 and valve rod 45 extend, is closed by a jacket 52 which extends downwardly and is closed at its lower end around the tube 49.

The other end of the upper valve casing 27 is provided with a lower opening 53 in which there is secured a bushing 54 which extends upwardly into the valve chamber 29 to form a flange or rim around the opening 53 and is provided with a shoulder 55 at its lower end. Between the shoulder 55 on the bushing 54 and a retaining ring 56 are secured the outer edges of one or more snap-acting thermal responsive discs 57 which are referred to in commerce as "Klixon" discs. These discs are connected from their center through a link or rod 58 to the valve operating lever 36 so that this lever is moved upwardly or downwardly as the discs snap from one position to the other responsive to a predetermined change in temperature.

The liquid container or intermediate vessel 26 is open at the top and provided with a flange 59 by which it is secured to the lower part of the upper valve casing 27 by bolts 60 in such a position that it is directly below the opening 53 and the Klixon discs 57. The joint between the vessel 26 and the valve casing 27 is made fluid-tight by a gasket 61. The bottom of vessel 26 is connected to the lower valve chamber 42 through conduit 62 and the upper valve chamber 29 communicates with the vessel 26 through opening 51, jacket 52, and conduit 63. A cover float 64 may be provided in the vessel 26 to prevent the contact of hot gas and absorption liquid during the process hereinafter described.

The overflow conduit 24 from the absorber 21 communicates with the upper valve chamber 29 through valve port 31, as shown in Figs. 1 and 2. A pressure relief line 65 arranged for part of its length within conduit 24 communicates at one end with the upper valve chamber 29 through valve port 30 and opens at its other end within the trough 66 in the upper part of the absorber 21 from which weak absorption liquid overflows into the absorber as shown in Figs. 1, 2, and 5. The pressure supply or equalizing conduit 67 communicates at one end with the upper valve chamber 29 through valve port 32 and at its other end with the upper part of an inverted vessel 68 enclosing a pressure chamber 69 which is open at the bottom below the normal liquid level in the generator 10, as shown in Figs. 1 and 2. The lower valve chamber 42 communicates through valve port 43 and conduit 70 with the upper part of the generator 10.

Starting with the conditions shown in the drawings, the valve operating lever 36 is in its lower position so that valve ports 30 and 31 in the upper valve casing are closed, valve port 32 in the upper casing is open, and valve port 43 in the lower casing is open. Hot gas from the generator flows through conduit 67 and valve port 32 into the upper valve chamber 29 and through opening 51, jacket 52, and conduit 63 to the intermediate vessel 26 forcing liquid from this vessel through conduit 62, lower valve chamber 42, valve opening 43, and conduit 70 into the generator 10.

The hot gas heats up the discs 57 which, when a predetermined temperature is reached, snap upwardly, raising the valve operating lever 36 to close valve ports 32 and 43 and open valve ports 30 and 31. The gas pressure is relieved through valve port 30 and conduit 65 into the absorber and cool liquid overflows from the absorber through conduit 24 and valve opening 31 into the upper valve chamber 29 and then through opening 51, jacket 52, and conduit 63 into the vessel 26 and does not contact the discs 57 until the vessel 26 fills with liquid. Liquid in the valve chamber 29 is prevented from flowing over onto the discs 57 through opening 53 by the rim around the opening formed by the bushing 54.

It has been found advisable to provide the cap 50 on rod 45 over the upper end of tube 49 to prevent the absorption liquid from splashing into the tube and thus entering the vessel 26 from the bottom. When the vessel 26 is filled the cool absorption liquid contacts the discs 57 and reduces their temperature to the point at which they snap downwardly, moving the valve operating lever 36 to its lower position, whereupon the valves are returned to their positions shown in the drawings previously described. The hot gas under pressure from chamber 69 in the generator 10 is again admitted to the intermediate vessel forcing the absorption liquid therein back to the generator and again heating the snap-acting discs 57, and the cycle is repeated.

The cover float 64 in the intermediate vessel 26 prevents excessive absorption of the hot gas in the generator into the absorption liquid which is being returned to the generator. It has been determined from experience that the snap-acting discs 57 will not snap upwardly until cooled by contact with the rising absorption liquid in the vessel 26. However, it is not impossible that the discs might cool sufficiently by radiation to operate before the transfer vessel is completely filled, in which case there will be merely a greater number of operations transferring a smaller amount of liquid at each operation.

The conduit 67 for high pressure gas from the generator to the transfer device may communicate directly with the gas space in the generator whereupon, in operation, the pressures will be equalized in the transfer device and generator, the liquid returning by gravity. However, with the arrangement described the gas in the chamber 69 within the generator is at a higher pressure than the gas in the upper part of the generator, whereby the rate of transfer of absorption liquid to the generator will be increased. The increased pressure in chamber 69 is due to the liquid head in the generator above the level to which the liquid is depressed in chamber 69 by the gas which accumulates in its upper portion.

It will be obvious to those skilled in the art that various other changes may be made in the construction and arrangement of parts without departing from the spirit of the invention and therefore the invention is not limited to what is shown in the drawings and described in the specification but only as indicated in the following claims.

I claim:

1. In absorption type refrigerating apparatus, a liquid transfer device comprising an intermediate vessel adapted to receive liquid by overflow from the absorber and discharge liquid by gravity to the generator, control valves for alternately connecting said vessel to the absorber and generator for the reception and discharge of liquid respectively, and thermal responsive means for operating said valves, said means being subjected alternately to the effect of cool liquid from the absorber and hot gas from the generator.

2. In absorption type refrigerating apparatus, a liquid transfer device comprising an intermediate vessel adapted to receive liquid from the absorber and discharge liquid to the generator by gravity, valves for alternately connecting said vessel to the absorber and generator for the reception and discharge of liquid respectively, means for operating said valves, and a snap-acting thermal responsive diaphragm for controlling said vave operating means and adapted to be subjected alternately to the effect of cool liquid from the absorber and hot gas from the generator.

3. In absorption type refrigerating apparatus, a liquid transfer vessel intermediate the absorber and generator, an overflow conduit from the absorber to said vessel, a pressure equalizing conduit from the absorber to said vessel, a liquid drain conduit from said vessel to the generator, a pressure equalizing conduit from the generator to said vessel, control valves for alternately connecting said intermediate vessel to the absorber and generator through said conduits, and thermostatic means for operating said valves subjected alternately to hot gases from the generator and cool liquid from the absorber.

4. In absorption type refrigerating apparatus, a liquid transfer vesel intermediate the absorber and generator, a liquid overflow conduit from the absorber to said vessel, a pressure equalizing conduit from the absorber to said vessel, a liquid drain conduit from said vessel to the generator, a pressure chamber opening downwardly within and below the liquid level in the generator, a conduit from the upper part of said pressure chamber to said transfer vessel, valves for controlling the connection of said transfer vessel alternately to the absorber and generator through said conduits, and thermal responsive means for operating said valves subjected alternately to hot gas from said pressure chamber and cool liquid from the absorber.

5. In absorption type refrigerating apparatus having a liquid transfer vessel intermediate the absorber and generator which is alternately connected to the absorber for the reception of liquid and to the generator for discharge of the liquid, means utilizing vapor from the generator for creating in said vessel, when connected for discharge into the generator, a pressure greater than that against which the liquid is discharged.

6. In absorption type refrigerating apparatus having a liquid transfer vessel intermediate the absorber and generator which is alternately connected to the absorber for the reception of liquid and to the generator for discharge of the liquid, means for subjecting said vessel, when connected for discharge to the generator, to a pressure greater than that against which liquid is discharged, said means comprising a chamber opening downwardly within and below the liquid level in the generator and adapted to be connected from its upper portion to said transfer vessel.

7. In absorption type refrigerating apparatus, a liquid transfer device comprising a vessel intermediate the absorber and generator, control valves for alternately connecting said vessel to the absorber for the reception of liquid by overflow and to the generator for the discharge of liquid by gravity, and means for operating said valves responsive to change in temperature in said vessel.

8. In absorption type refrigerating apparatus, a liquid transfer device comprising a vessel intermediate the absorber and generator, control valves for alternately connecting said vessel to the absorber for the reception of liquid by overflow and to the generator for the discharge of liquid by gravity, and a snap-acting thermostat for operating said valves located in the upper part of said vessel.

9. In absorption type refrigerating apparatus, a liquid transfer device comprising a vessel intermediate the absorber and generator, control valves for alternately connecting said vessel to the generator for the discharge of liquid by gravity, a snap-acting thermostat for operating said valves located in the upper part of said vessel, and means to prevent contact of liquid from the absorber with said thermostat until said vessel is substantially filled.

10. In absorption refrigeration apparatus, a generator, an absorber, means including an intermediate vessel for transferring absorption solution from said absorber to said generator, and means for controlling the operation of said transfer means responsive to temperature in the upper part of said vessel.

11. In an absorption refrigeration system having a liquid transfer vessel intermediate the absorber and generator which is alternately connected to the absorber for reception of liquid and to the generator for discharge of the liquid, means to create a liquid column in the system for producing in said vessel, when connected for discharge into the generator, a pressure greater than that against which the liquid is discharged.

12. In an absorption refrigeration system, a generator, a condenser, an absorber, an evaporator, a transfer vessel, conduits connecting said elements, valves for alternately producing flow of liquid from the absorber to the transfer vessel and from the transfer vessel to the generator, means for operating said valves including a snap-action disc movable to remote positions due to internal stresses caused by variations in temperature, and means to alternately heat and cool said disc.

13. In an absorption refrigeration system, a generator, a condenser, an absorber, an evaporator, a transfer vessel, conduits connecting said elements, valves for alternately producing flow of liquid from the absorber to the transfer vessel and from the transfer vessel to the generator, means for operating said valves including a snap-action disc movable to remote positions due to internal stresses caused by variations in temperature, and means to periodically subject said disc to cool liquid from the absorber.

14. In an absorption refrigeration system, a generator, a condenser, an absorber, an evaporator, a transfer vessel, conduits connecting said elements, valves for alternately producing flow of liquid from the absorber to the transfer vessel and from the transfer vessel to the generator, means for operating said valves including a snap-action disc movable to remote positions due to internal stresses caused by variations in temperature, and means to periodically subject said disc to hot vapors from the generator.

15. In an absorption refrigeration system, a generator, a condenser, an absorber, an evaporator, a transfer vessel, conduits connecting said elements, valves for alternately producing flow of liquid from the absorber to the transfer vessel and from the transfer vessel to the generator, means for operating said valves including a snap-action disc movable to remote positions due to internal stresses caused by variations in temperature, and means to alternately subject said disc to cool liquid from the absorber and hot vapor from the generator.

ERIC H. RYDEN.